June 24, 1969  H. B. KUSTER  3,451,568
PACKAGE UNIT FOR HANDLING SHIPPING CONTAINERS
Filed Aug. 2, 1967  Sheet 1 of 4
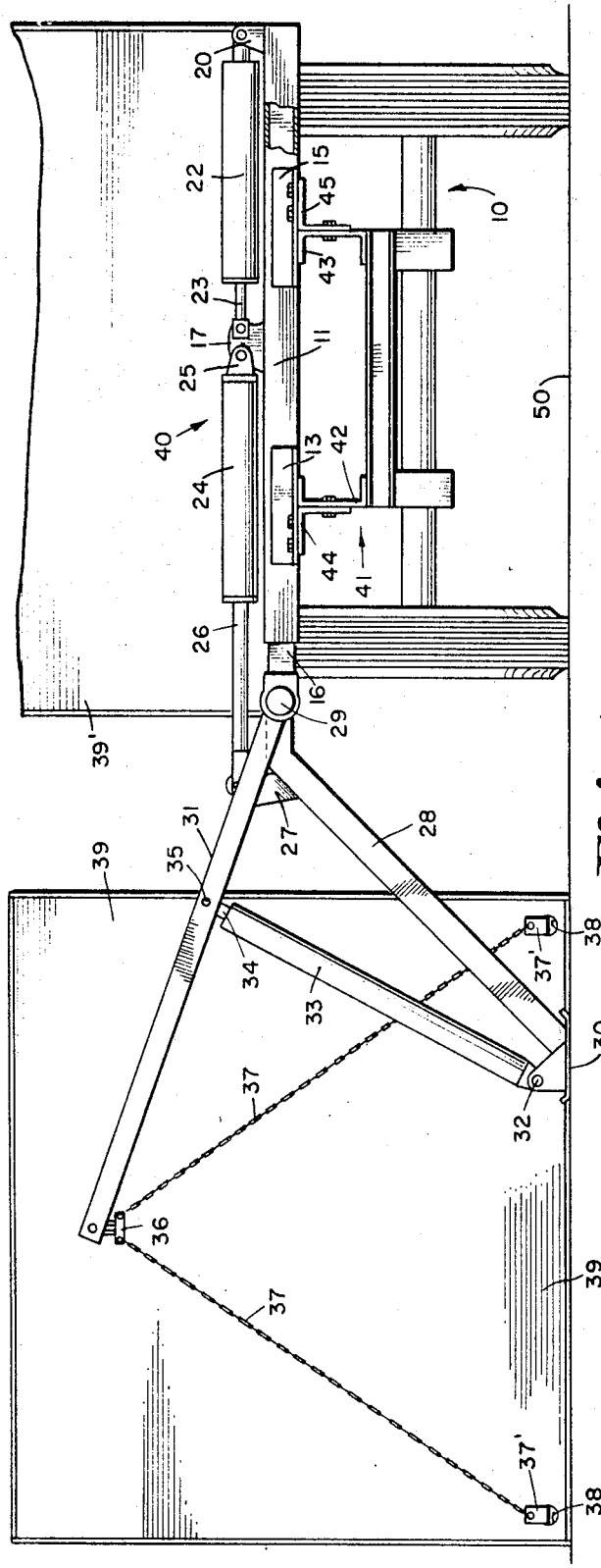
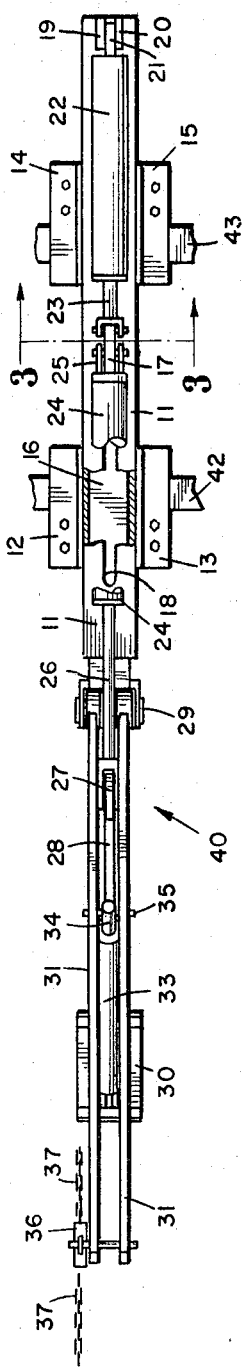
INVENTOR
HARRY B. KUSTER
BY
Herbert Q. Nineteen
ATTORNEY

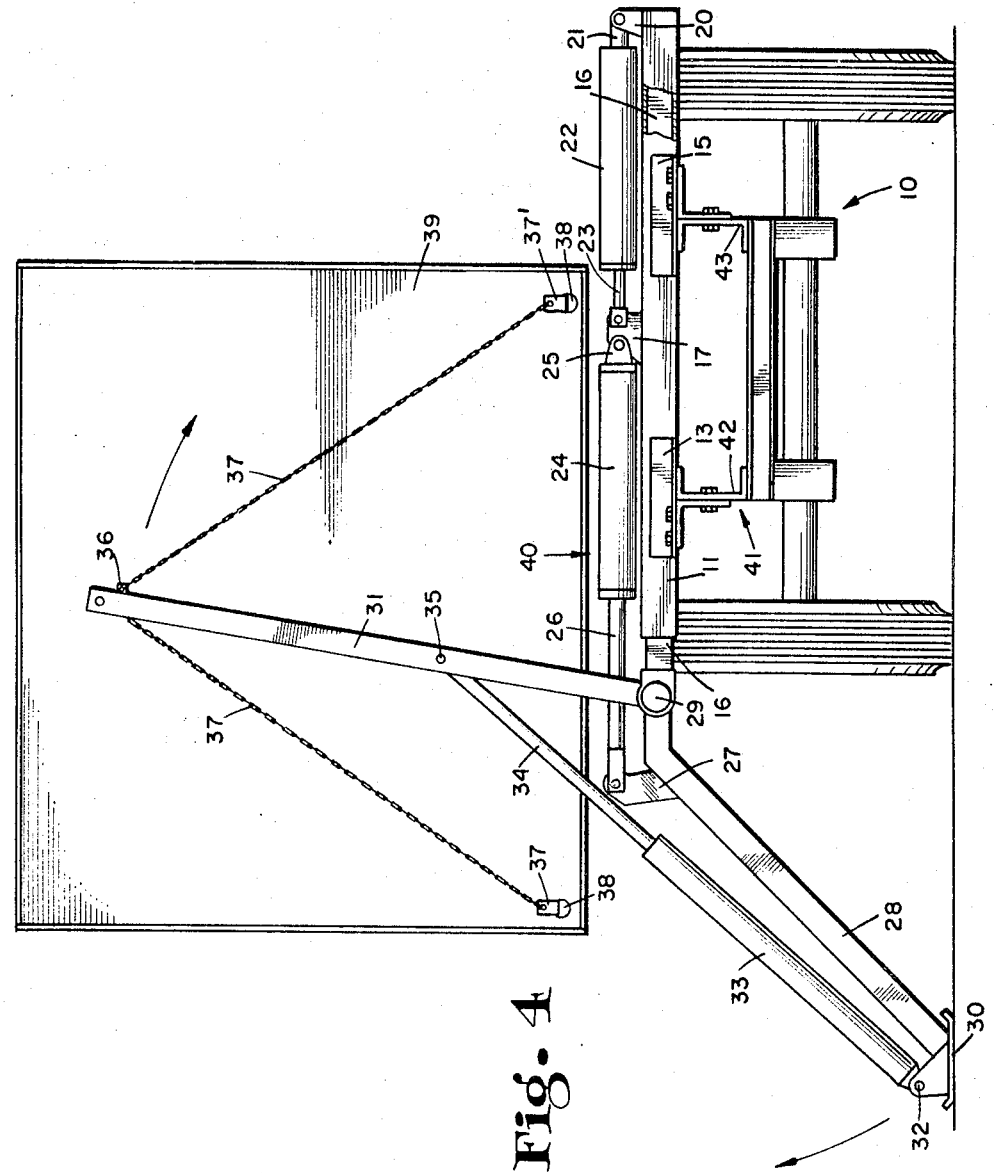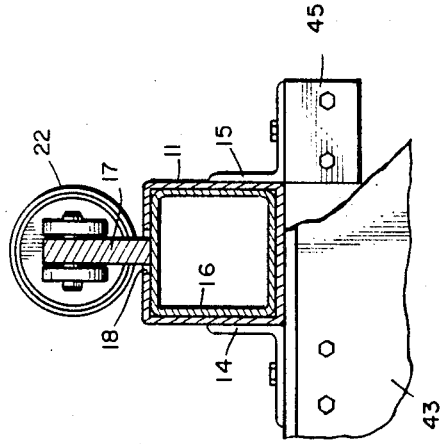
INVENTOR
HARRY B. KUSTER
BY
ATTORNEY

INVENTOR
HARRY B. KUSTER
BY
Herbert A. Minturn
ATTORNEY

INVENTOR
HARRY B. KUSTER
BY
ATTORNEY

United States Patent Office 3,451,568
Patented June 24, 1969

3,451,568
PACKAGE UNIT FOR HANDLING SHIPPING CONTAINERS
Harry B. Kuster, Centerville, Ind., assignor to Golay & Co., Inc., Cambridge City, Ind., a corporation of Indiana
Filed Aug. 2, 1967, Ser. No. 657,965
Int. Cl. B65g 67/02, 67/58
U.S. Cl. 214—77                     3 Claims

ABSTRACT OF THE DISCLOSURE

A package unit for mounting on a vehicle, such as a truck, trailer or railway car, comprising a swingable ground contacting lever; a pair of in-line hydraulic cylinders with one cylinder attached to the vehicle with its piston rod attached to a slide and the other cylinder is attached to the slide with its piston rod being in turn rockably connected to the ground lever; a boom rockably pivoted from the vehicle adjacent the ground lever; and a hydraulic cylinder interconnected between an outer length portion of the lever and the boom.

---

This invention resides in a construction for use on a vehicle for loading and unloading individual containers on and from the vehicle such as a truck, trailer-truck, or railway car, whereby the vehicle may pick up and deposit the container at will independently of having to employ a container handling structure fixed at some central station which would require the vehicle to travel to and from that station for its load or discharge thereof.

As one example, by employing the inventive structure mounted on and carried by the vehicle, the vehicle may transport and deposit an empty container to and at a predetermined destination where it may be loaded, while the vehicle transports a second container to another destination. When the containers are loaded, the vehicle may return and pick them up and carry them to a station where the containers are placed on another vehicle such as a transcontinental scheduled vehicle, or placed on a dock for further transfer.

Again, by use of the invention, a vehicle may leave a plant with several containers, each for a different destination on a scheduled run. One container may be left at a stop and the vehicle is not tied up to await the unloading of that one container, but may immediately proceed to the next stop to leave a second container, and so on. Variations in the use of the invention from those examples may, of course, be employed.

A further important object of the invention is to provide a structure that may be folded into a rather compact unit for shipping to a vehicle operator whereby he may attach two or more of the structures to vehicles he has rather than having to send the vehicle to a shop to have the unit built on the vehicle.

A still further object of the invention is to provide a unit of the above indicated character wherein there is incorporated means preventing tipping of the vehicle when it is being loaded or unloaded from a side of the vehicle. This means is workable either by making direct contact with the ground or by bearing on a dock or another vehicle.

The invention is described in one particular form in reference to the accompanying diagrammatic drawings, in which:

FIG. 1 is a fragmentary view in rear elevation of a vehicle to which the structure embodying the invention is applied and is shown in that position attached to a container preparatory to lifting the container onto the vehicle;

FIG. 2 is a view in top plan of the inventive structure in an outboard extended position as illustrated in FIG. 1;

FIG. 3 is a view in section on the line 3—3 in FIG. 2;

FIG. 4 is a fragmentary view in rear elevation of the vehicle with the container lifted over the vehicle and ready to be swung into resting position;

Figure 5:
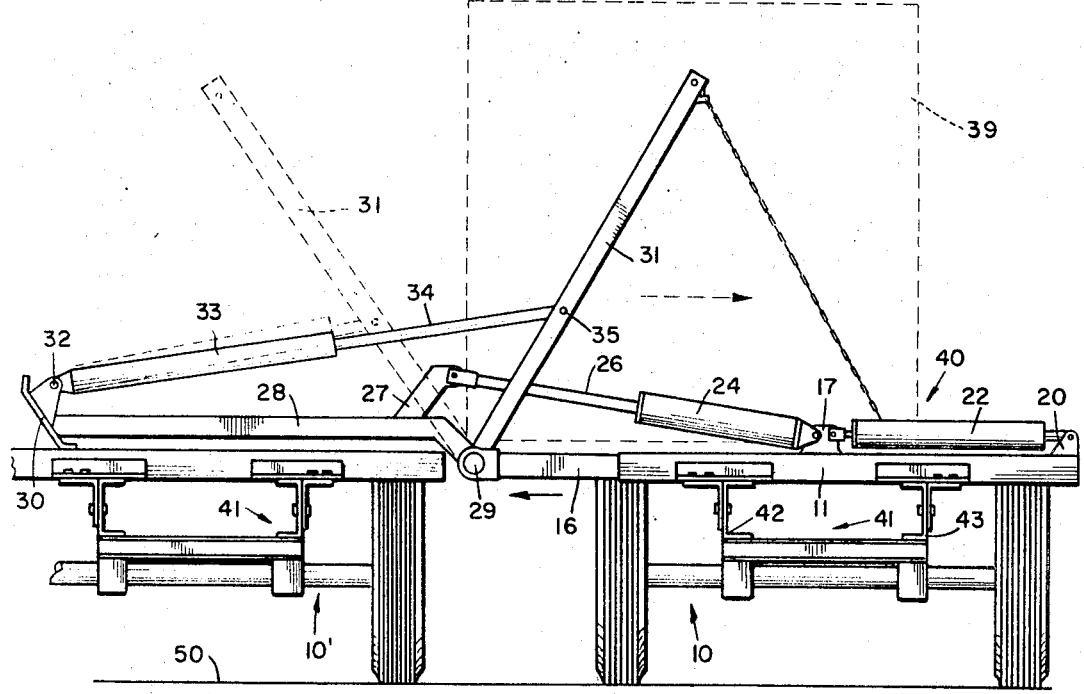
FIG. 5 is a fragmentary view in rear elevation indicating two side by side vehicles with a container lifted from one vehicle ready to be transferred to the other vehicle.

A base 11 herein shown as a length of rectangular tubing has mounting flanges 12, 13 and 14, 15 fixed to opposite, vertical sides thereof, FIG. 2. A rectangular slide 16 slidingly fits within the base tubing 11. The slide 16 carries a head 17 which extends vertically through a base slot 18. Ears 19 and 20 are fixed to and upturned from the right hand end (as viewed in FIG. 2), of the base 11, and an ear 21, fixed to the end of a hydraulic cylinder 22, is held between the ears 19 and 20. The cylinder 22 extends to the left along the base 11 and has its piston rod 23 attached to the head 17.

A second hydraulic cylinder 24 has a cylinder end 25 rockably attached to the head 17 and has its piston rod 26 rockably attached to an arm 27 in turn fixed to a tilt-preventing lever 28. This lever 28 is rockably hinged to the left end portion of the slide 16 at 29. A shoe 30 is fixed to the outer end of the lever 28.

A boom 31 is rockably hinged to the tube 16 at 29. A hydraulic cylinder 33 is rockably hinged to the shoe 30 at 32 and has its piston rod 34 hingedly connected to the boom 31 at the pivot pin 35. The outer end of the boom 31 preferably carries a rocker 36, to the outer ends of which is secured a cable or chain 37. These chains 37 spread apart to have hooks 37′ in the lower end of each to engage in receptacles 38 adjacent the lower outer corner of each of two opposite sides of a container 39.

Figure 7:
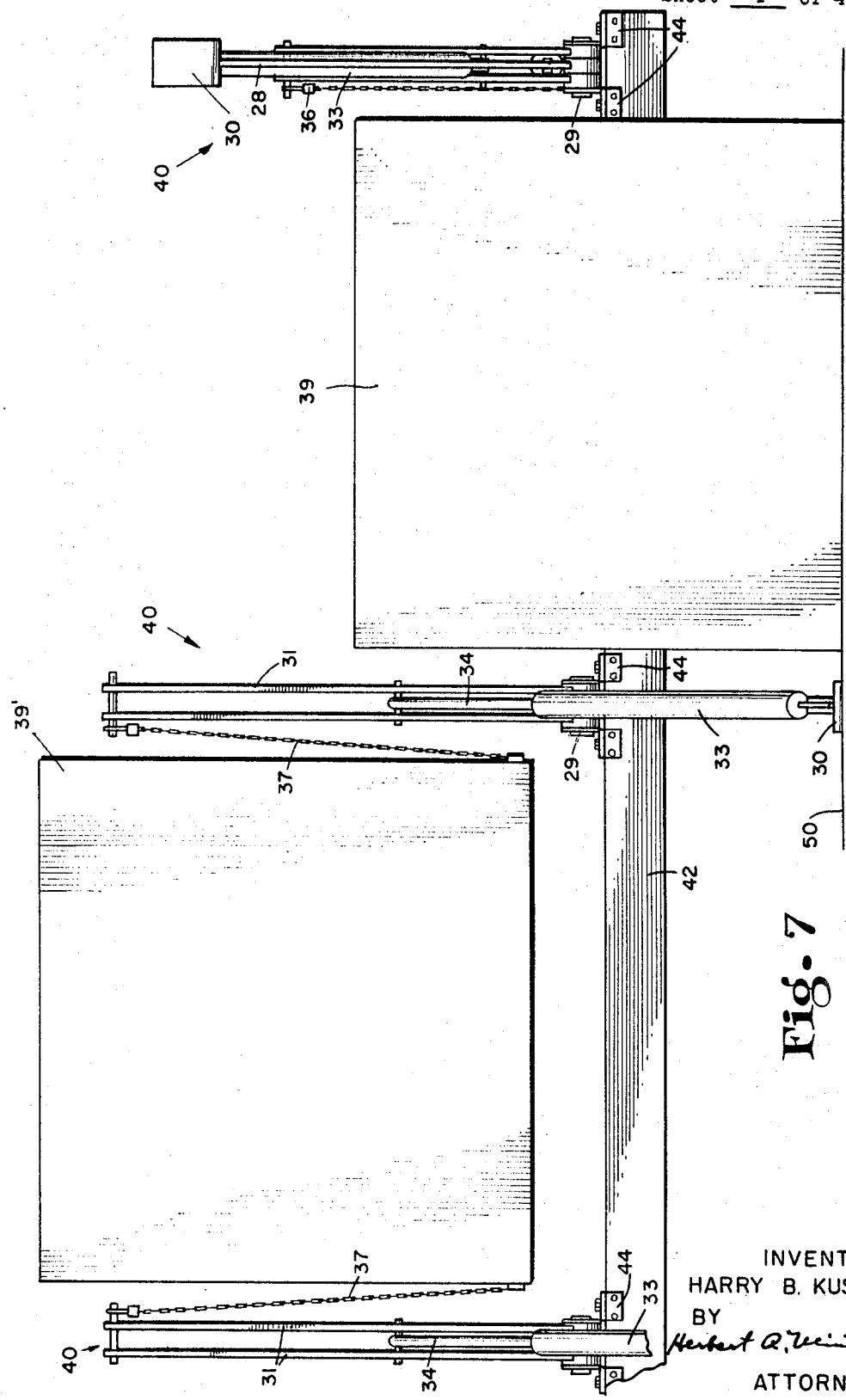
FIG. 7 is a fragmentary side elevational view of a vehicle with three of the inventive structures mounted thereon.

There are two of these container handlers generally designated by the numeral 40. That is, there is required one handle for each of the two opposite container sides. As indicated in FIG. 7, for two containers, there are three handlers 40, the central handle being employed for either container 39 or 39′. For longer chassis than the one 41 on which additional containers are carried, one additional handler 40 for each additional container would be required. The handler 40 in each instance is secured to chassis members 42, 43 by means of bolting thereto through intermediate brackets 44, 45, FIG. 1. As indicated in FIG. 7, framework may be employed upon which the containers 39 may rest above the chassis so that the floors of the containers be at or above the top sides of the cylinders.

The container handler above described may be folded into a package by disconnecting the connection 35; the piston rod from the arm 27; the lever 28 and cylinder 33 rocked around under the base 11; and boom 31 down over the cylinders 24 and 22; and held in stock and shipped to customers in the package state.

Operation

Figure 6:
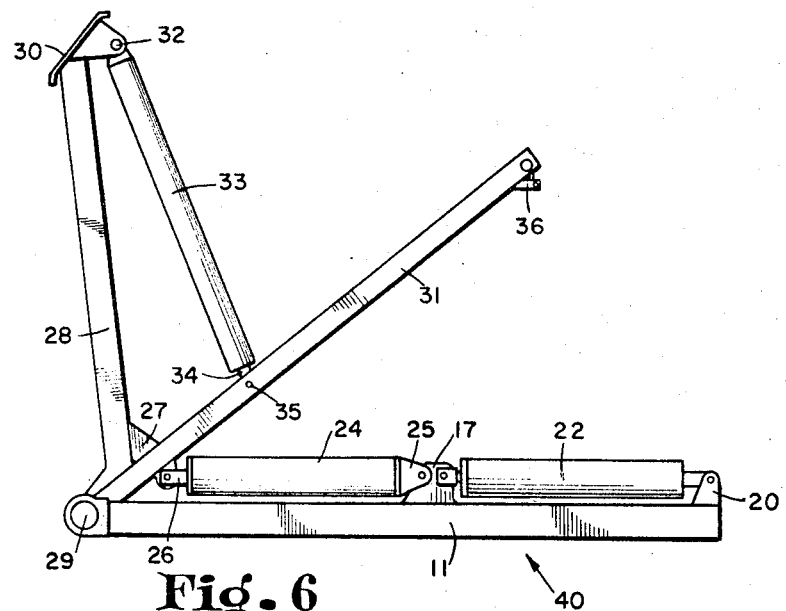
FIG. 6 is a side elevation of the inventive structure in a position to be carried by the vehicle in its travels.

Assuming the handler 40 to be in the travelling positions, FIGS. 6 and 7, and a container 39, FIG. 1, is to be picked up and loaded from the ground level 50, the cylinders 24 one on each side of the container are energized to swing the levers 28 around to bring the shoes 30 into compressive contact with the ground 50 and the booms 31 into their like positions with the piston rods 34 of the cylinders 33 retracted all as shown in FIG. 1, where but one handler is shown.

The chain hooks 37' are engaged in the respective sockets 38. The piston rods 34 of the cylinders 33 are extended as indicated in FIG. 4, while the shoes remain seated on the ground. As the booms 31 lift the container 29, the lever 28 in each instance prevents side tilting of the chassis 41 which might otherwise occur due to the container weight or mass being to one side of the chassis center.

When the piston rod 34 in each instance reaches approximately its maximum extension, the container 39 will have been carried sufficiently over the chassis to permit the cylinder 24 to be energized to retract its rod 26 lifting the lever 28 and the cylinder 33 to rock the boom 31 farther to carry the container and deposit it centrally, laterally of the chassis. The chains 37 are then released, and the handlers 40 may lift along the sides of the container or the boom 31 returned outwardly and the chassis moved along the side of another container, depending upon the sequence desired.

Of course, by following the reverse steps, the containers may be unloaded.

As has been indicated above, containers may be transferred from the chassis 10 to another chassis or to a loading dock. In this regard, reference is made to FIG. 5, where two chassis 10 and 10' are indicated as being side by side.

The anti-tilt lever 28 carried by the chassis 10 rests across the top of the chassis 10'. The boom 31 is lifting a container 39 from the chassis 10 and, upon swinging to the dash line position over the chassis 10', will deposit the container 39 on that chassis 10'. The feature of the slide 16 shiftable in the base 11 makes this possible. This tube 16 is shifted by energizing the cylinder 22 which may push or pull on the head 17 as may be required to position the boom 31 and its carried container over the second chassis 10'. The same procedure is had in case a dock is used in place of the second chassis. The shoe 30 pushes down on a remote side of the second chassis 10' to prevent chassis 10 from tilting.

Thus it is to be seen that an extremely simple device is presented to make better uses of goods containers, not only in preventing intermixing of separate orders of goods in less than car or truck loads, but also in saving much idle time in vehicle disposition. While the one particular form of structure has been described in detail, it is obvious that structural changes therefrom may be made without departing from the spirit of the invention and, therefore, I do not desire to be limited to that precise form beyond limitations which may be imposed by the following claims.

I claim:
1. A loading and unloading container unit comprising a boom;
a boom carrying member; said boom being rockably carried by one end by said member and extending therefrom to swing approximately vertically by a free length outer end portion;
an anti-tilt lever rockably carried by said member to swing approximately vertically therefrom by a free end portion;
a first hydraulic means swing said lever; and
a second hydraulic expandable and contractible means interconnected between and with said lever outer end portion and said boom intermediate its said one end and said free end portion;
said second hydraulic means supporting said boom from said anti-tilt lever;
a third hydraulic means horizontally shifting simultaneously the rockable connections of said boom and said lever with said carrying member.
2. The structure of claim 1, in which
a shoe is carried on said anti-tilt lever outer free end portion; and
said second hydraulic means connects with said shoe.
3. The structure of claim 1, in which
both said boom and said lever are rockably carried by said member on a common horizontal axis.

References Cited

UNITED STATES PATENTS

| | | | |
|---|---|---|---|
| 2,777,586 | 1/1957 | Boysen et al. | 212—145 |
| 3,073,458 | 1/1963 | Wieschel | 212—145 |
| 3,095,099 | 6/1963 | Costello | 214—77 |
| 3,155,250 | 11/1964 | French et al. | 214—138 |
| 3,244,301 | 4/1966 | Vaughan | 212—145 X |
| 3,249,235 | 5/1966 | Roberts | 212—8 |

FOREIGN PATENTS 546,706   4/1956   Netherlands.

GERALD M. FORLENZA, *Primary Examiner.*

ROBERT J. SPAR, *Assistant Examiner.*

U.S. Cl. X.R.

212—8; 214—146.5